Patented Apr. 25, 1950

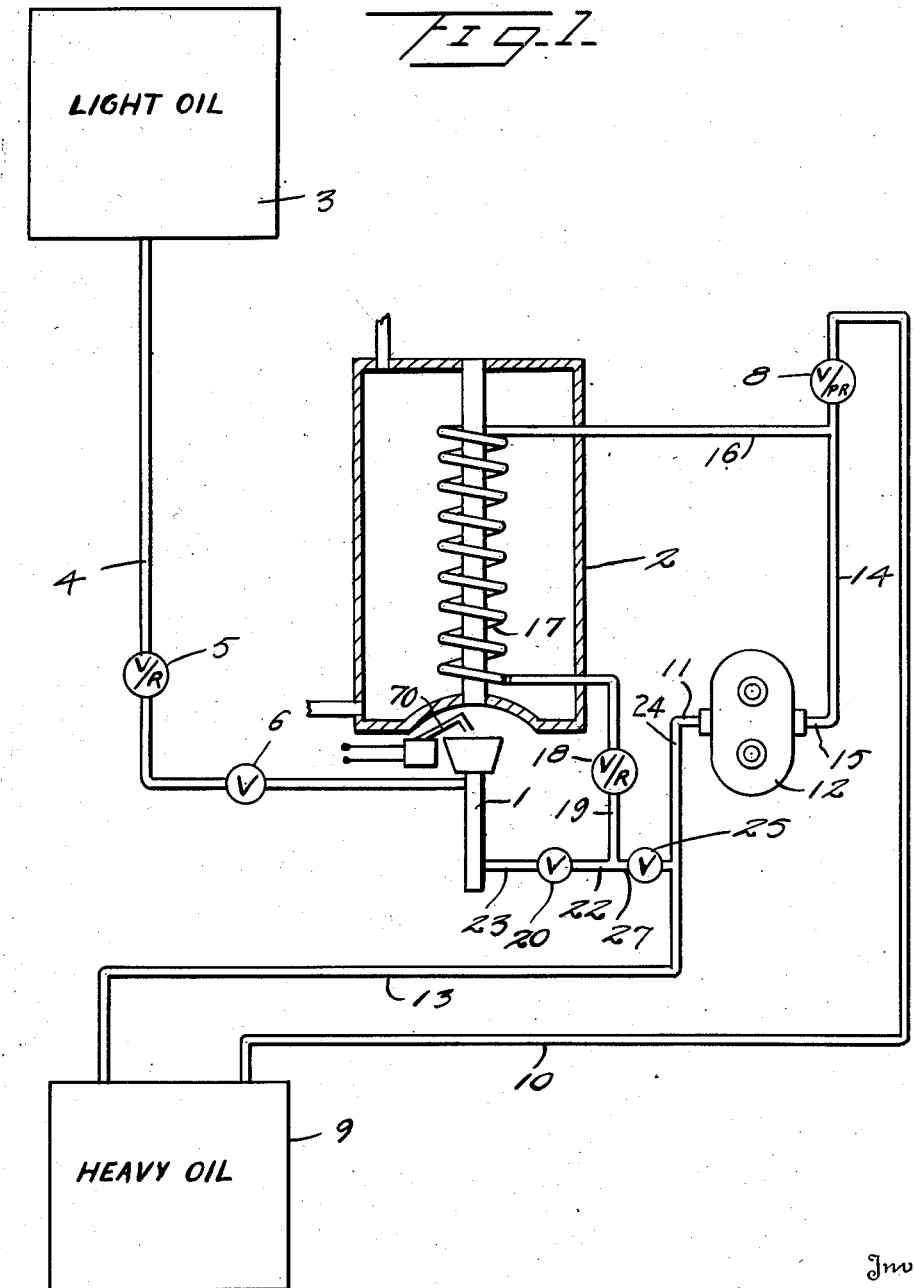

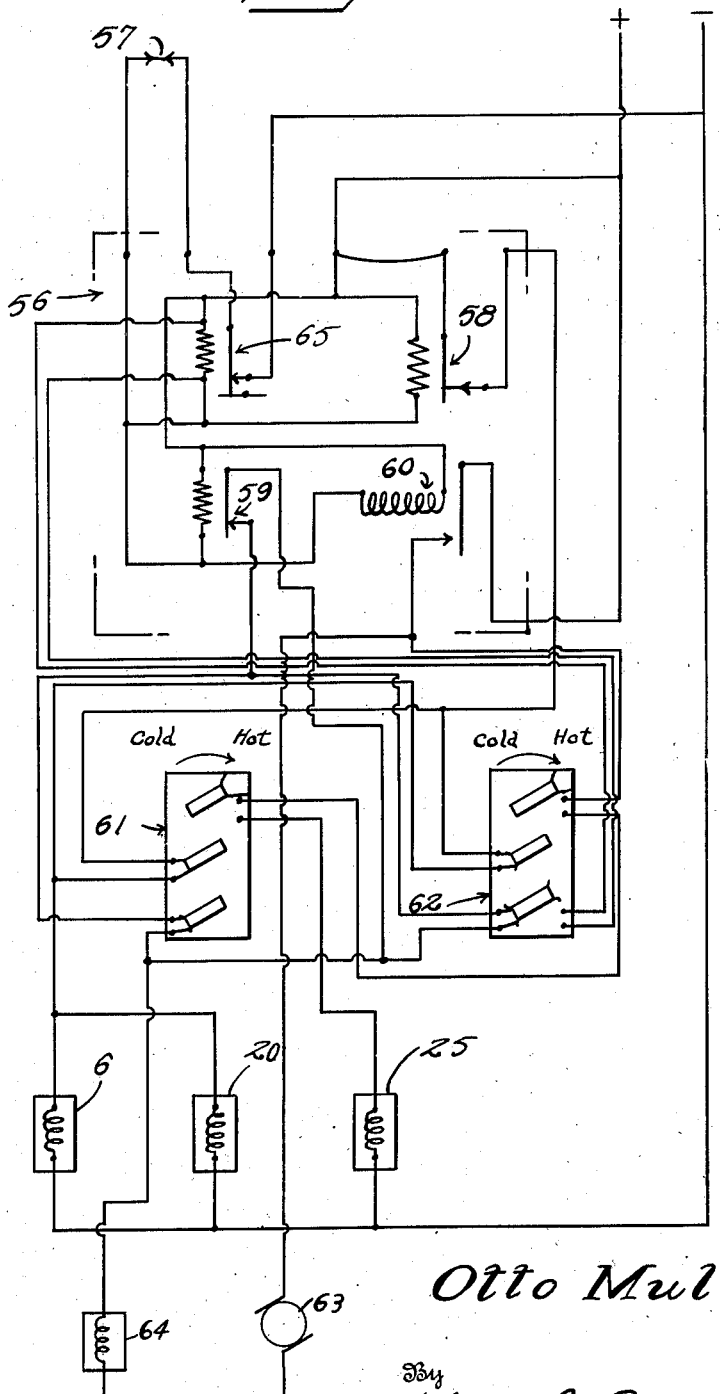

2,505,298

UNITED STATES PATENT OFFICE 2,505,298

REGULATING MEANS FOR FUEL OIL HEATING SYSTEMS

Otto Muller, Bronx, N. Y.

Application June 28, 1945, Serial No. 601,969

3 Claims. (Cl. 158—36)

This invention relates generally to the art of heating and more particularly to an improved fuel oil heating system and is a continuation in part of my copending application Serial No. 414,901, filed October 13, 1941, abandoned July 11, 1945, for Fuel oil heating systems.

One of the principal objects of the invention is to provide a fuel oil heating system wherein provision is made for starting the oil burner employed on relatively light oil and, after a desired temperature has been reached, automatically changing to a heavier oil.

Another object of the invention is to provide a fuel oil heating system by the use of which it will be possible to burn fuel oil of a volatility which requires pre-heating without the need of large separate pre-heaters and other cumbersome equipment.

Another object of the invention is to provide a fuel oil heating system which will operate with equal efficiency with rotary type burners and both high and low pressure nozzle type burners.

A further object is to provide a system of this character including the step of scavenging relatively cold oil from the burner before the same is supplied with oil of the proper temperature.

A further object of the invention is to provide a heating system of the type set forth wherein there is included the step of scavenging relatively heavy oil from the burner before the same is started on relatively light oil.

A further object of the invention is to provide a heating system of the type set forth herein wherein there is included the step of scavenging relatively heavy oil from the burner at the end of the running period and leaving it empty of oil, same to be supplied with and started on relatively light oil.

A further object of the invention is to provide a heating system of the type set forth wherein is included the step of scavenging relatively heavy oil from the burner at the end of each running period, and delivering a charge of relatively light oil to the burner before operation ceases, this relatively light oil being used for starting the burner for the next operating period.

A further object of the invention is to provide a heating system of the type set forth wherein there is included the step of scavenging relatively heavy oil from the burner before the same is started on relatively light oil and which provides a means of circulating heavy oil through heaters (heated by the burning of the light oil) until the heavy oil has reached a predetermined temperature.

A further object of the invention is to provide a heating system wherein the steps of scavenging, starting on light oil, heating heavy oil, circulating heavy oil for heating purposes, and changing from light to heavy oil when the heavy oil has reached a predetermined temperature, are accomplished entirely automatically.

A further object of the invention is to provide a heating system wherein the steps of scavenging, starting on light oil, heating heavy oil, circulating heavy oil for heating purposes, and changing from light to heavy oil are accomplished automatically each time the burner is started regardless of the temperature of the oil in the system.

A further object of this invention is to provide a heating system wherein the step of scavenging at the end of the running period, leaving the burner empty of oil during idle periods, starting on light oil, heating heavy oil, circulating heavy oil for heating purposes, and changing from light to heavy oil, are accomplished automatically each time the burner is stopped and started regardless of the temperature of the oil in the system.

A further object of the invention is to provide a heating system wherein the steps of scavenging and delivering a charge of light oil to the burner at the end of every running period, leaving the burner empty of oil between running periods, starting on the light oil and changing from light to the heavy oil, are accomplished automatically each time the burner is stopped and started regardless of the temperature of the oil in the system.

Other objects of the invention will be apparent as the description proceeds.

In the drawings:

Figure 1 is a schematic view showing the arrangement of my improved fuel oil heating system, the burner employed being of the low pressure rotary type, and The diagram shown as Figure 2 discloses the electrical means of controlling the control valves 6, 20 and 25 shown in Figure 1.

Referring to Figure 1, the aforementioned motor may be used to drive both the pump 12 and the rotary burner 1. At this point, it should be mentioned that separate motors can be used to drive the pump 12 and the burner 1, in which case the second motor is connected in parallel with the first.

Referring to Figure 2, the aforementioned motor is used to drive the pump 41. In this case, the burner 29 is a stationary nozzle type requiring no motor.

The aforementioned ignition apparatus is the standard equipment that is part of the burner 1 shown in Figure 1. This ignition apparatus usually consists of a gas torch, which is constantly lit as a small flame, and which is expanded to the proper size flame required for ignition during the ignition period.

Referring now more particularly to the drawings and to Figure 1 thereof wherein my improved system, as applied to low pressure rotary type burners, is shown, the numeral 1 indicates in general the burner. The burner 1 is of conventional design and is mounted in a boiler 2, said boiler being shown in dotted lines. At 3 is shown an oil tank. This tank is to contain oil of light volatility and will be hereinafter designated as the light oil tank. The tank 3 is connected with the burner 1 by a pipe 4. Mounted in the pipe 4 beneath the tank is a regulating valve 5 which is of conventional design. Also mounted in the pipe 4, between the valve 5 and the burner 1 is a control valve 6 which is preferably operated by a solenoid. In this connection, it is desired particularly to point out that the valve 6 may be operated manually, by a compressed air cylinder, steam cylinder or by any other suitable means. In other words, I do not desire to limit myself to the use of a solenoid.

At 8 is shown a pressure regulator which is of any desired and well-known construction. The pressure regulator 8 is connected with a second oil tank 9, which will be hereinafter designated as a heavy oil tank, by a return pipe line 10. The heavy oil tank 9 is also connected with the intake 11 of a fuel pump 12 by a pipe 13. The pump 12 is of the positive pressure gear type of conventional construction, through which no oil can flow when it is not in operation. A pipe 14 connects the discharge 15 of the pump with the pressure regulator 8. The pipe 14 also is connected with a pipe 16 which is connected to the inlet of an oil heater 17 which is mounted in the boiler 2 or connected externally thereto. The outlet of the oil heater 17 is connected with a regulating valve 18 by a pipe 19, the valve being similar to the valve 5.

At 20 is shown a control valve which is similar in construction to the valve 6 and is operated by a solenoid although, as stated in connection with the description of the valve 6, said valve may be operated by other means. A pipe 22 leads from the inlet of the valve 20 to the outlet of the regulating valve 18, while another pipe 23 leads from the outlet of the valve 20 to the burner 1.

A pipe 24 leads from the pipe 13 to the outlet of a control valve 25 which is operated by a solenoid and is of similar construction to the valves 6 and 20. The inlet of the valve 25 is connected by a pipe 27, to the pipe 22.

As hereinbefore pointed out, although the valves 6, 20 and 25 are shown as being operated by solenoids, said valves may be operated by other means. However, when the valves are operated by the solenoids, said solenoids will be effectively controlled as indicated in the diagram shown as Figure 2 and described hereinafter. The wiring is conventional and may be varied to suit particular conditions.

The operation of this embodiment of the invention will now be described in more detail. Heavy oil, from a previous period of operation of the burner 1, is first scavenged from said burner in the following manner. The valve 20 is allowed to remain open as is the valve 25. However, the valve 6 is closed. The fuel pump 12 is first placed in operation, and during the scavenging period, the pump will draw the heavy oil from the burner through the pipe 23, the valve 20, the pipes 22 and 27, the valve 25 and the pipes 24 and 11 and delivered to the pump 12 and to the heavy oil tank 9 through the pipe 14, regulating valve 8, and pipe 10. It will thus be seen that, prior to starting the burner, all heavy oil is removed therefrom. During this period, very little oil is drawn through the pipe 19 due to the restriction of the regulating valve 18. The capacity of the pump 12 is greater than the amount of oil that will be permitted to flow through the regulating valve 18 at any time, therefore, during the scavenging operation when valves 20 and 25 are open, and valve 6 is closed, the pump will draw the oil from the burner 1 because the atomizing unit of this burner is open to atmospheric pressure and will permit the pump to draw all the oil out. A certain amount of oil will be drawn through valve 18, but as this amount is less than the capacity of the pump, the oil will also be taken from the burner. The oil taken from the burner 1 and valve 18 is discharged into the pipe 14 under pressure, and as the pipes 16 and 17 can carry only an amount of oil equal to that removed from the valve 18, the oil in excess of that amount must necessarily be forced out through the valve 8, therefore, the amount of oil drawn from burner 1 is discharged through valve 8 during the scavenging period. After this has been done, the burner is ready to start. The valve 25 is now allowed to remain open, the valve 6 is now opened and the valve 20 is now closed as indicated in the diagram shown as Figure 2 and described hereinafter. Thus, during the starting period, light oil will flow by gravity from the light oil tank through the pipe 4, the regulating valve 5, the valve 6 and to the burner 1. Light oil will thus be supplied for starting purposes. During this period, the pump 12 draws heavy oil through the oil heater 17, valve 18, pipes 19 and 27, control valve 25 and pipes 24 and 11. This oil is of course pumped through pipes 14 and 16 to heater 17. Due to the fact that valve 20 is closed during this period the pump, which cannot be satisfied through the regulating valve 18, draws oil from the tank 9 through pipe 13. This equivalent amount of oil is discharged by the pump through the valve 8 and returned to the tank through pipe 10.

When the oil in the heater 17 and in the pipes leading from said heater back to pump 12 has reached the desired temperature, the valve 20 will be automatically opened. At the same time, the valves 25 and 6 are automatically closed as indicated in the diagram shown as Figure 2 and described hereinafter, with the result that light oil from the tank 3 will be shut off and heavy oil will be fed directly from the heater 17, regulating valve 18, pipes 19 and 22, valve 20, and the pipe 23 to the burner 1. Any surplus heavy oil will return to the tank 9 through the pipe 10.

During this continued operation, the pump 12 draws the required heavy oil from tank 9 through pipes 13 and 11, and discharges it through pipes 14 and 16 into the heater 17 maintaining the pressure for which the pressure regulating valve 8 is set. The surplus oil is discharged through the pressure regulating valve 8 and flows back to tank 9 through pipe 10, thus delivering a constant supply of oil to burner 1 for normal operating conditions.

The above description describes the cycle of operation wherein the scavenging cycle occurs at the beginning of the running period. It is to be understood that the scavenging cycle can occur at the end of the running period and that the burner can be left empty of oil or supplied with a charge of light oil at the end of the running period, it being only necessary to properly convert the valves and controls to produce this condition.

It is desired particularly to call attention to the fact that, by the use of my improved system, it will be possible to burn heavy fuel oil without employing separate pre-heaters or other cumbersome equipment. Moreover, it is also desired to point out that, in view of the particular arrangement, the change over from the light oil to the heavy oil will be allowed to take place without interruption of the flame and without puff or smoke. My system may be adapted for use with heating plants of moderate size as well as with those of larger size.

It is now desired to describe the means by which the aforementioned apparatus, shown on Figure 1, is electrically controlled.

Referring now particularly to Figure 2, the detail of operation is as follows:

The apparatus 56 is an oil burner relay of conventional design which is used as an intermediary control between the thermostat and the oil burner equipment. This apparatus is actuated by the closing of the circuit of a thermostat 57 or other means of control. The closing of the circuit through the control apparatus 57 completes the circuit through the time delay switches 58, 59 and 65 and the relay 60.

The time delay switch 58 controls the timing of the scavenging period. The switch contacts are normally open and are timed to close at the end of the scavenging period.

The time delay switch 59 controls the ignition apparatus 70. The contacts are normally closed and are timed to open at the end of the ignition period.

The time delay switch 65 is the safety device which automatically interrupts the main line circuit should ignition fail to occur within a given period of time. This device mechanically locks the "circuit opening contacts" and must be manually reset before further operation is possible. The relay 60 controls the line circuit. The contact is normally open, and, when closed, continues the circuit to the motor, ignition apparatus and the control valves.

The apparatus 61 is a thermostatically controlled apparatus which is actuated by the temperature of the heavy oil and is installed to permit its actuating element to come in contact with the oil flowing through the pipe 19 after it leaves the heater 17. This apparatus may be either of the mercury tube contact type or the mechanical contact type. The apparatus shown in the diagram is of the mercury tube type. It is so constructed that the tubes swing from one inclined position to another, causing the mercury therein to flow to the contacts and close the circuit or to flow away from the contacts and open the circuit. The tubes shown in the diagram are in the position they assume when the heavy oil is below the desired temperature. When the heavy oil reaches its desired temperature the tubes swing as indicated by the arrow to the hot position.

The apparatus 62 is also a thermostatically controlled apparatus which is actuated by the heat of the burner flame. It may be located to come in contact with the hot gases of combustion in either the combustion chamber, the flue passages, or the flue pipe of the boiler 2. This apparatus may be either of the mercury tube contact type or the mechanical contact type. The apparatus shown in the diagram is of the mercury tube type. It is so constructed that the tubes swing from one inclined position to another, causing the mercury therein to flow to the contacts and close the circuit, or to flow away from the contacts and open the circuit. The tubes shown in the diagram are in the position they assume when there is no fire in the combustion chamber. When combustion takes place the heat causes the tubes to swing as indicated by the arrow to the hot position.

The apparatus 6, 20 and 25 represents the electrical mechanism of the control valves bearing the similar numbers shown in Figure 1. These control valves may be operated manually, electrically, by compressed air, steam, or any other suitable means. The valves indicated in Figure 2 are of the solenoid type, the mechanical closing and opening of which is controlled by a solenoid magnet.

Valve 6 is of the normally closed type, while valves 20 and 25 are of the normally open type.

The above described apparatus is interconnected electrically as indicated in diagram shown as Figure 2. The cycle of operation, from a cold start, is as follows:

The control apparatus 57 demands heat and closes the circuit which causes apparatus 56 to start to function. The time delay switch 58 starts to close, the time delay switch 59 starts to open, and the relay 60 immediately closes. The apparatus 61 and 62 are each in their cold position. Under these conditions the scavenging period takes place because the valve 6 is mechanically closed, valve 20 is mechanically open, and valve 25 is mechanically open. During this time, the suction of the pump 12 scavenges the heavy oil from the burner 1 through the unrestricted pipe connections 23, 22, 24 and 11. Very little oil is drawn through the pipe connection 19 during this time due to the restriction of the regulating valve 18. This scavenging period continues until the time delay switch 58 is closed at which time the circuit is completed to the control valve 6 and the control valve 20, causing valve 6 to mechanically open and valve 20 to mechanically close. Valve 25 remains open. With valve 6 open, valve 20 closed and valve 25 open, the scavenging ceases and light oil is supplied to the burner from light oil tank 3 through pipe line 4, through the regulating valve 5 and the open control valve 6. The pump suction does not influence the oil burner 1 because valve 20 is closed. However, the suction of the pump continues to draw oil through the heater 17 and regulating valve 18 because the valve 25 is open. Very little, if any, oil is drawn through pipe 13 during this period due to the fact that the suction of pump 12 is satisfied by the gravity flow from heater 17. During this period the ignition of the light oil takes place and the burner continues to operate on light oil until the heavy oil flowing through the heater 17 and pipe 19 reaches the desired temperature and causes apparatus 61 to function.

At the time combustion of the light oil took place, the heat of the flame caused apparatus 62 to swing to its hot position. However, the tubes of apparatus 62 are so connected that they will not influence the control valves as long as apparatus 61 remains in its cold position.

When the temperature of the heavy oil flowing through pipe line 19 causes apparatus 61 to assume its hot position, the circuit through the valve 25 is closed by the action of the top tube causing it to mechanically close. At the same time, the action of the middle tube opens the circuit through valve 6 causing it to mechanically close and also opens the circuit through the valve 20 causing it to mechanically open.

With the valve 6 closed, the valve 20 open, and the valve 25 closed, the burner now continues to function on the heated heavy oil instead of the light oil. The burner is now in its normal operating condition, during which time the suction of the pump draws oil from the heavy oil tank 9, through pipe lines 13 and 11 and discharges same into pipe line 14. The pressure regulating valve 8 causes oil at proper pressure to flow through pipe 16 to the heater 17 while the surplus oil returns to the tank 9 through pipe line 10. The oil flow through the heater and pipe line 19 is controlled by the regulating valve 18 which permits the right amount of oil to flow to the burner 1 through pipe 22, open control valve 20 and pipe 23. The burner continues to burn heavy oil until temperature control apparatus 57 has been satisfied.

Thus, this apparatus makes possible the use of oil of extremely high viscosity without the use of auxiliary heating apparatus.

The operation described in the previous paragraphs was the cycle of operation from a "cold boiler" start. During normal operation, however, the burner is often started under "hot boiler" conditions. During a hot boiler start the heavy oil will have been previously heated to the required temperature and the apparatus 61 will be in its hot position at the beginning of the starting cycle. In this case, the tubes in apparatus 61 will not influence the control valves but rather the tubes in apparatus 62, which, as previously stated, function the same as those in apparatus 61, will influence the control valves. During the hot boiler start, the apparatus 56 functions as during the cold boiler start. The scavenging period is, therefore, the same also. However, immediately after the combustion of the light oil takes place, the heat of the flue gases actuates apparatus 62 which immediately causes the burner to assume its normal operation and it continues to burn the heavy oil until the control apparatus 57 has been satisfied.

For the purpose of avoiding a complicated diagram, the motor circuit and the ignition circuit have been omitted from Figure 2. These are described later.

The foregoing is the detail explanation of the embodiment of my fuel oil heating system wherein the feature of the scavenging of the heavy oil from the burner is accomplished at the beginning of every running period before light oil is supplied to the burner for starting purposes. The various drawings and electrical diagrams show the equipment so connected and constructed as to bring about the aforementioned sequence of operation.

It is to be understood that my invention includes electrical equipment embodiments as follows:

Equipment of similar material as described in the foregoing, but in which scavenging occurs at the end of each running period leaving the burner empty of oil until the next running period at which time it is supplied with light oil for starting purposes, and heavy oil for normal operating purposes.

The feature of scavenging the heavy oil from the burner at the end of the running period and leaving the burner empty of oil during idle periods, and the feature of scavenging the heavy oil from the burner at the end of the running period, supplying a charge of light oil at the end of the running period and leaving the burner filled with light oil during idle periods is accomplished by a modification in relay 60 of apparatus 56 (Figure 2).

In conclusion, I state that my equipment, as described above, is applicable to all types of oil burners, making possible the use of heavy oil without manual attention and without the use of large and expensive auxiliary heating equipment, which equipment is also costly to maintain. I wish also to point out that my apparatus, besides assuring automatic ignition, is free from puffs and smoky starts. Great savings are experienced through the use of my apparatus because heavy oil costs considerably less per gallon and contains more heat units per gallon. In addition to these savings, is the additional saving of the cost of manual operation necessary with other types of systems. Furthermore, my apparatus includes every possible safety precaution such as the continued ignition until the burner is properly functioning in its normal condition, and the safety device which makes it impossible to discharge excessive amounts of unburned oil either before ignition takes place or after ignition takes place, if, for any reason, the flame should fail.

I also wish to call attention to the minimum amount of service brought about by ignition failure which would be common to burners where ignition of heavy oil is accomplished by small torches rather than a complete light oil fire as in the case of my equipment.

What I claim is:

1. A fuel oil heating system comprising a burner, a light oil tank, a pipe connecting said light oil tank to said burner, a normally closed control valve between said tank and said burner, a heavy oil tank, pipes connecting said heavy oil tank to said burner, a motor driven pump between said heavy oil tank and said burner, an oil heater operatively connected between said pump and said burner, a normally open shut off valve between said heater and said burner, a bypass pipe between said heater and said pump, a normally open by-pass shut off valve in said by-pass pipe, a return pipe between said pump and said heavy oil tank, and a pressure control valve in said return pipe, a solenoid operator for each of said valves, normally closed temperature responsive switches connected to the solenoids of said control and shut off valves, a normally open temperature responsive switch connected to the solenoid of said by-pass shut off valve, said switches being responsive to the heavy oil temperature, a second normally closed temperature responsive switch between said first normally closed switches and a source of current supply and a second normally open temperature responsive switch between said first normally open switch and said current supply, said second named switches being responsive to the temperature of said burner, a thermostat control switch responsive to the demand of said heating system between said second named switches and said pump motor and said current supply source and a normally open time delay switch between said thermostat switch and said second named switches, whereby said pump will be energized for initially scavenging said burner upon initial closing of said thermostat switch, said control valve and said shut off valve will be reversed upon closing of said time delay switch thereby supplying light oil to said burner for starting, said burner temperature responsive switches then reversing upon temperature rise of said burner, and said oil temperature switches reversing upon rise of the heavy oil temperature again reversing said shut off and control valves and said by-pass valve for operation of said burner on heavy oil.

2. A fuel oil heating system as set forth in claim 1, a normally open relay connected in said supply circuit between said thermostat and said second named switches, and a normally closed time delay switch connected between said thermostat and said relay and operatively connected to a normally open burner temperature responsive switch, whereby said circuit will be opened upon failure of ignition of said burner after a predetermined time.

3. A fuel oil heating system as set forth in claim 1, including a normally open time delay switch connected to said thermostat, an electric burner ignition control member operatively connected to said latter time delay switch for igniting said burner a determined time after closing of said thermostat and after the scavenging period.

OTTO MULLER.

REFERENCES CITED

The following references are of record in the file of this patent:

UNITED STATES PATENTS

| Number | Name | Date |
|---|---|---|
| 1,451,798 | Williams | Apr. 17, 1923 |
| 1,562,910 | Nock | Nov. 24, 1925 |
| 1,610,290 | Jones et al. | Dec. 14, 1926 |
| 1,731,806 | Aldrich | Oct. 15, 1929 |
| 1,735,911 | Sundstrand | Nov. 19, 1929 |
| 1,776,871 | Thurber | Sept. 30, 1930 |
| 1,780,357 | Metcalfe | Nov. 4, 1930 |
| 1,862,690 | Macrae et al. | June 14, 1932 |
| 1,943,750 | Tryon | Jan. 16, 1934 |
| 2,142,979 | Hans | Jan. 3, 1939 |
| 2,143,277 | McCorkle | Jan. 10, 1939 |
| 2,149,842 | Fowler | Mar. 7, 1939 |
| 2,188,565 | Bower | Jan. 30, 1940 |
| 2,243,594 | DeVoe et al. | May 27, 1941 |
| 2,347,843 | Rayfield | May 2, 1944 |
| 2,370,847 | Dempster | Mar. 6, 1945 |

FOREIGN PATENTS

| Number | Country | Date |
|---|---|---|
| 356,994 | Great Britain | Sept. 17, 1931 |